J. C. MOORE.
Corn-Planter.

No. 28,498.

Patented May 29, 1860.

Witnesses:

Inventor:

UNITED STATES PATENT OFFICE.

J. CAMPBELL MOORE, OF PEORIA, ILLINOIS.

IMPROVEMENT IN CORN-PLANTERS.

Specification forming part of Letters Patent No. 28,498, dated May 29, 1860.

*To all whom it may concern:*

Be it known that I, J. CAMPBELL MOORE, of the city and county of Peoria, State of Illinois, have invented certain new and useful Improvements in Corn-Planters, of which the following is a full, clear, and exact description, reference being had to the accompanying drawings, forming part of this specification, in which—

Figure 1:
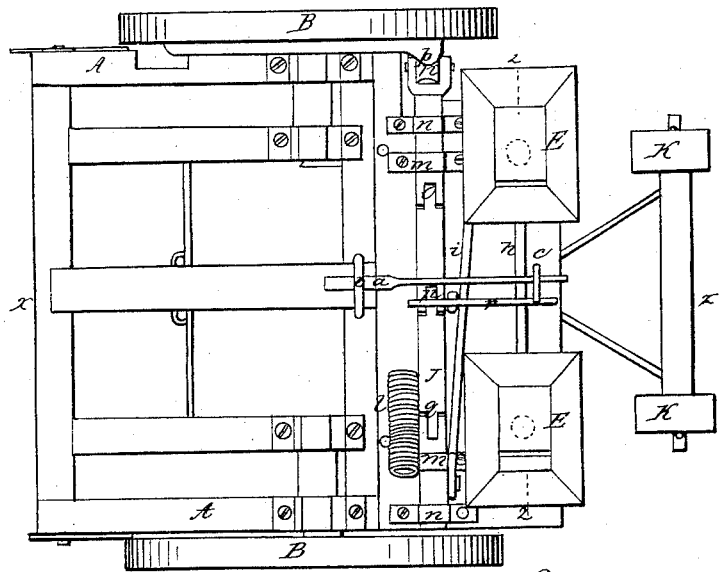
Figure 2:
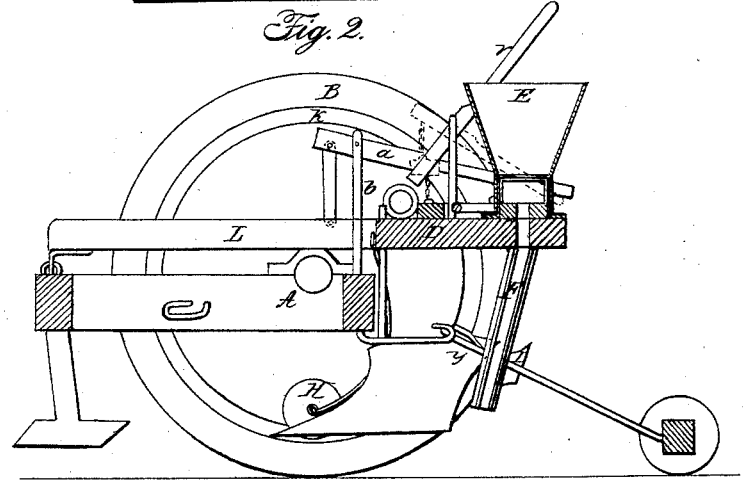
Figure 3:
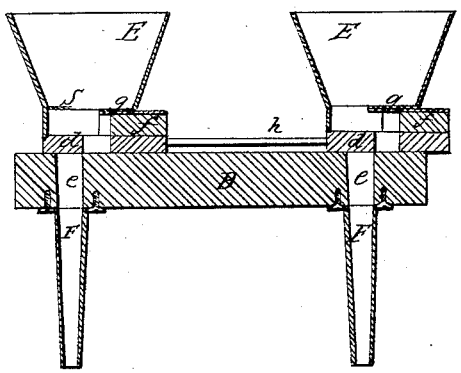

Figure 1 represents a plan of a corn-planter embracing my improvements. Fig. 2 represents a sectional elevation on the line $x\,x$; and Fig. 3 represents a sectional elevation through the seeding-box, on line 2 2, Fig. 1.

The object of my invention is to simplify the mechanism for arresting the movement of the seed-box slide and cutting off the discharge of the seed, and to operate by means of this slide the measuring-cup and cut-off, and thus simplify the mechanism for measuring or regulating the quantity of seed discharged in each hill, and my invention for effecting these objects consists in jointing the bar giving motion to the seed-box slides, so that the central portion may be raised and withdraw the bar from the operating mechanism, while at the same time the slide is thrown over the discharge-opening of the seed-box.

By reference to the accompanying drawings my invention will be fully understood.

The seeding-machine to which my improvements are applied consists of a rectangular frame, A, supported on wheels B, whose axles are in such position in relation to the frame that the weight of the driver in front counterbalances the weight of the seed-box and contents. A platform, D, on the rear of the frame carries two seed-boxes, E, placed at the requisite distance apart for the rows of hills. The platform supporting the seed-boxes is hinged to the front girt of the frame by means of a bar, L, extending from the platform to the front.

Connected with the openings in the bottom of the seed-boxes are tubes F, through which the seed passes to the drill, and directly in front of these tubes, and also attached to the platform, is a drill-plow, G. In front of the plow-point is a rotary colter, H, which also performs the function of a clearer to the point of the plow.

To the outer mold-board of each plow is attached a covering-scraper, I, which extends back of the seeding-tubes, gathers the earth thrown out by the plow, and covers the seed after it is deposited in the drill. The platform, and with it the seeding-tube and plow, are raised above the surface of the ground, when not in use, by means of a lever, $a$, pivoted at one end to the bar extending forward from the platform, the fulcrum of which is supported by a gallows-frame, $b$. In depressing this lever the platform is raised and the outer end of the lever caught under a hook, $c$, attached to the platform, so that the platform remains suspended at two points and supported by the gallows-frame.

Attached to the frame, and extending backward, are rollers K, for compressing the earth in the drill over the seed after it has been deposited and covered.

Through the platform forming the bottom of the seed-boxes are openings $e$ for the passage of the seed to the seed-tubes. Covering these openings $e$ are slides $d$, through which, also, openings are made corresponding in size to those through the bottom of the box, and attached to these slides back of the openings are semicircular concave abutments $f$, which may be made adjustable. On the top of the abutment, and extending over the openings through the slides, are cut-off plates $g$, which, in connection with the abutment and the openings through the slides, form chambers for measuring the seed.

Secondary adjustable cut-off plates may be attached to that side of the box opposite the measuring-chamber, and so arranged that when on the forward movement of the slides the openings through the bottom of the seed-boxes are uncovered to allow the passage of the grain the edges of the stationary and moving cut-off will be sufficiently near to each other to prevent the grain entering the measuring-chamber.

A connecting-rod, $h$, unites the slides of the two seed-boxes, and to one of these slides is attached one end of a link, $i$, the other end of which is attached to a bar, J. This bar receives motion in one direction from a cam, $k$, on the inner face of one of the wheels, and in the opposite direction from a spring, $l$, and communicates to the slides a reciprocating movement, opening and closing the orifice through which the seeds pass. This bar moves in guides $m$, and the end resting upon the cam is provided with a friction-pulley, $n$. The central part is jointed at three points, $o\,p\,q$. The raising the central joint by means of a lever, r, draws back that end of the bar pressing against the face of the cam, and at the same time the spring acting on the opposite end moves it so as to close the openings in the bottom of the seed-boxes if at the time they are open. Thus the cutting off the discharge of the seed from the seed-box and arresting of the action of the cam on the bar operating the seed-box slides are made instantaneously and at any portion of the revolution of the cam.

I do not confine myself to the precise form, construction, or arrangement of the parts as described, as the cut-off plate may be made adjustable independent of the adjustment of the abutment forming the back of the measuring-chamber, for the purpose of varying the time of cutting off the admission of seed into the chamber. The bar operating the seed-slides, instead of being jointed to raise vertically may, if thought best, be jointed to draw out horizontally.

Having thus described my improvement in corn-planters, what I claim therein as new, and desire to secure by Letters Patent, is—

The combination of the jointed bar with the operating cam and spring, arranged substantially as described, so that by bending the central joint the bar is withdrawn from the cam, the discharge of the seed cut off, and the movement of the slide to the seed-box arrested.

In testimony whereof I have subscribed my name.

J. CAMPBELL MOORE.

Witnesses:
 JOHN ANDERSON,
 J. R. BROWN.